United States Patent [19]
Dalton et al.

[11] Patent Number: 5,748,902
[45] Date of Patent: May 5, 1998

[54] POLARITY SWITCHED DATA BUS FOR REDUCED ELECTROMAGNETIC INTERFERENCE

[75] Inventors: Scott W. Dalton, Tomball; Todd D. Podhaisky, Spring, both of Tex.

[73] Assignee: Compaq Computer Corporation, Houston, Tex.

[21] Appl. No.: 684,536

[22] Filed: Jul. 19, 1996

[51] Int. Cl.[6] .......................... H04L 25/34; H04L 25/49
[52] U.S. Cl. .............. 395/200.76; 395/306; 395/200.63; 375/260; 375/288; 375/289; 375/360; 370/545; 371/56
[58] Field of Search ................. 395/200.13, 200.18, 395/306; 375/260, 288, 289, 360; 370/464, 545; 371/56, 55; 364/514 R

[56] References Cited

U.S. PATENT DOCUMENTS

| 4,369,516 | 1/1983 | Byrns | 375/359 |
|---|---|---|---|
| 4,558,409 | 12/1985 | Goss et al. | 364/222.2 |
| 4,823,364 | 4/1989 | Herzog | 375/258 |
| 4,825,450 | 4/1989 | Herzog | 375/288 |
| 4,897,854 | 1/1990 | Harris et al. | 375/286 |
| 5,057,646 | 10/1991 | Nichols et al. | 174/36 |
| 5,283,807 | 2/1994 | Graham | 364/717 |
| 5,406,632 | 4/1995 | Sogo et al. | 704/233 |
| 5,422,919 | 6/1995 | Graham | 375/200 |
| 5,438,342 | 8/1995 | Yamaguchi | 345/58 |
| 5,438,621 | 8/1995 | Hornak et al. | 380/43 |
| 5,446,772 | 8/1995 | Korhonen | 375/257 |
| 5,517,433 | 5/1996 | Morrison | 364/602 |
| 5,623,518 | 4/1997 | Pfiffner | 375/278 |

OTHER PUBLICATIONS

65100/101 "Panellink Technology High Speed Transmitter and Receiver, Data Sheet Revision 0.7", pp. i–iv, and 1–36 (Dec. 1996).
Panellink Overview (Jun. 19, 1996), Revision 0.4.
"Chip Set Reduces Rising EMI in Notebook Computers", *Electronic Design* (Jun. 24, 1996), p. 48.

*Primary Examiner*—Emanuel T. Voeltz
*Assistant Examiner*—Cuong H. Nguyen
*Attorney, Agent, or Firm*—Pravel, Hewitt, Kimball & Krieger

[57] ABSTRACT

In a data bus with m data bits, electromagnetic interference is produced by polarity switching the data on that data bus. When two consecutive data items result in a change of over half of the data bits, the polarity of the second data item is switched, and a polarity signal is correspondingly switched on the data bus. When the data is received, it is restored to its original polarity by adjusting the polarity of the received data according to the signal on the polarity line. In this way, the total number of bit transitions between any two data items is reduced to a maximum of m/2.

22 Claims, 5 Drawing Sheets

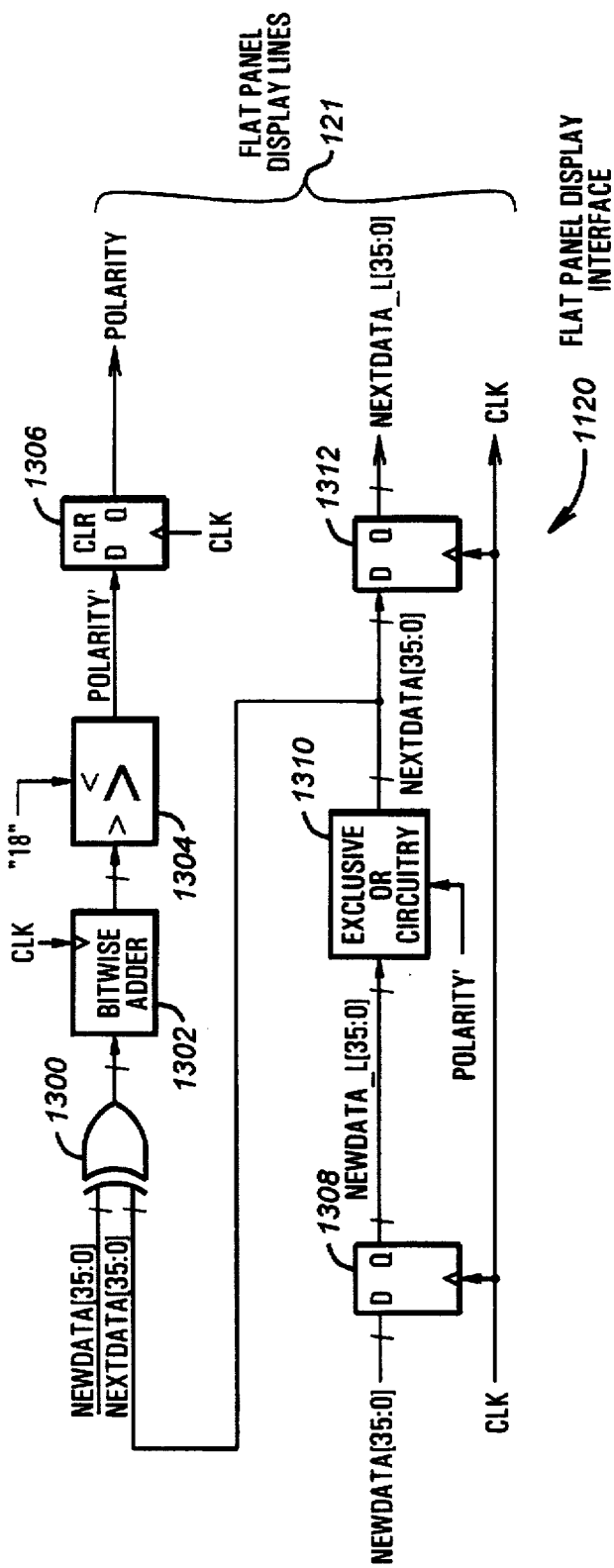
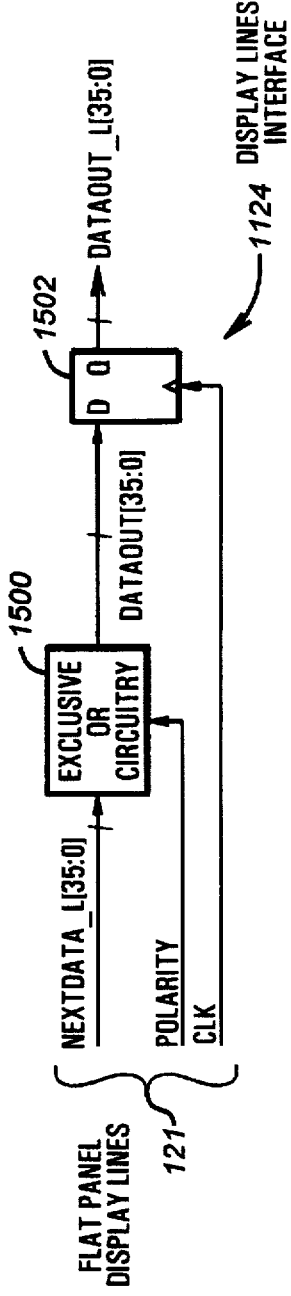
FIG. 5
FIG. 6

POLARITY SWITCHED DATA BUS FOR REDUCED ELECTROMAGNETIC INTERFERENCE

BACKGROUND OF THE INVENTION

1. Field of the Invention

The invention relates to digital data buses, and more particularly relates to a technique of reducing electromagnetic interference produced by data transmissions over a digital data bus.

2. Description of the Related Art

Electronic devices have become a pervasive part of modern day life. Whether at home, in the office, or on the road, a member of modern society finds electronic equipment no longer a mere practicality, but a virtual necessity. Personal computers, cellular phones, integrated facsimile machines/copiers, and the networks that interconnect them all are becoming the norm rather than the exception.

This profusion of electronic devices has brought problems in the form of added "noise." Not audible noise, but electronic noise. This noise is known as EMI, or electromagnetic interference, and one can appreciate its invisible presence when, for example, an airline pilot forbids the use of electronic devices. This EMI, though unseen, can adversely affect other electronic equipment.

Electromagnetic interference especially becomes a problem as the frequency of electrical signals becomes higher. At high frequencies, electromagnetic interference becomes difficult to shield against, difficult to contain, and a potentially serious problem for other electronic components. These problems are especially troublesome when high frequency signals are transmitted over cabling. An example would be the cable between a personal computer and its video display unit. The data travels over this cabling at high frequencies, and because cabling is used, rather than a shielded box, reduction of EMI is all the more difficult.

Many approaches have been used to reduce electromagnetic interference, such as shielding of cables, using twisted pairs of wires, reducing the voltage levels on cables, and using sinusoidal signals on cables. Each of these techniques has its own advantages and drawbacks. Generally, multiple techniques can be used to advantage, because reduction in EMI tends to be cumulative—if one shields, uses twisted pairs, and reduced voltages, the advantageous effects of each technique are additive. Therefore, any additional new techniques for reducing EMI could generally be used with existing techniques.

The reduction of EMI is especially important in today's "green" environment. While current Federal Communications Commission regulations provide a target for EMI that manufacturers must meet, the current trend is for even further reduction of these invisible emissions. Not only are there voluntary attempts to reduce electromagnetic interference, along with testing by various laboratories in pinpointing which computer systems are "green," but there is the potential for even more stringent regulatory requirements of reduced electromagnetic interference. Therefore, it would be desirable to develop additional techniques for reducing electromagnetic interference, especially inexpensive techniques with broad application.

SUMMARY OF THE INVENTION

Therefore, according to the invention, a new technique is described for reducing electromagnetic interference over data cables that include multiple signal lines for carrying data. In a data cable with, for example, m data lines plus a clock line, an additional data polarity signal line is added to indicate the polarity of the signals on the data lines. When data is transmitted over the data line, a first clocked data item of m bits is stored for comparison to the next clocked data item. If less than one-half of the data bits change between the first and the second data items, then the data polarity signal remains the same, and the two data items are transmitted at the same polarity over the data cable.

If, however, over one-half (or m/2) of the data bits have changed state, then the data polarity signal is switched, and the polarity of each of the data signals is correspondingly switched. This reduces the number of data transitions between any two data items. Subsequent data items are then transmitted at the same polarity as the preceding item if m/2 or less bits have changed state, or at switched polarity if the over m/2 bits have changed state.

For example, if a data item of 8$b$11111111 (binary representation of 8 data bits at a high value) is followed by a data item of 8$b$00000000, without this new polarity switching technique 8 simultaneous data transitions would occur over the data cable, causing a corresponding EMI pulse. Using the new polarity switching technique, however, these 8 transitions are not sent over the data cable. Instead, the data polarity bit is simply switched. The data actually transmitted remains 8$b$11111111 between the two data items, but on the receiving end, the state of the second transmitted data item is inverted in response to the data polarity bit yielding the proper actual data of 8$b$00000000.

This technique finds broad application, not only in data cables, but on virtually any bus over which parallel data must be transmitted at high speed. By including a polarity bit, one reduces the number of transitions between any two data items to no more than half the number of data bits plus one.

BRIEF DESCRIPTION OF THE DRAWINGS

A better understanding of the present invention can be obtained when the following detailed description of the preferred embodiment is considered in conjunction with the following drawings, in which:

FIG. 5 is a schematic illustration of an alternative to the transmitting circuitry of FIG. 2 that can be used to create the polarity switched data signals for transmission over a data bus according to the invention;

FIG. 6 is a schematic illustration of an alternative to the circuitry of FIG. 4 for retrieving the original data from the polarity switched data transmitted over a bus according to the invention;

DETAILED DESCRIPTION OF THE PREFERRED EMBODIMENT

Figure 1:
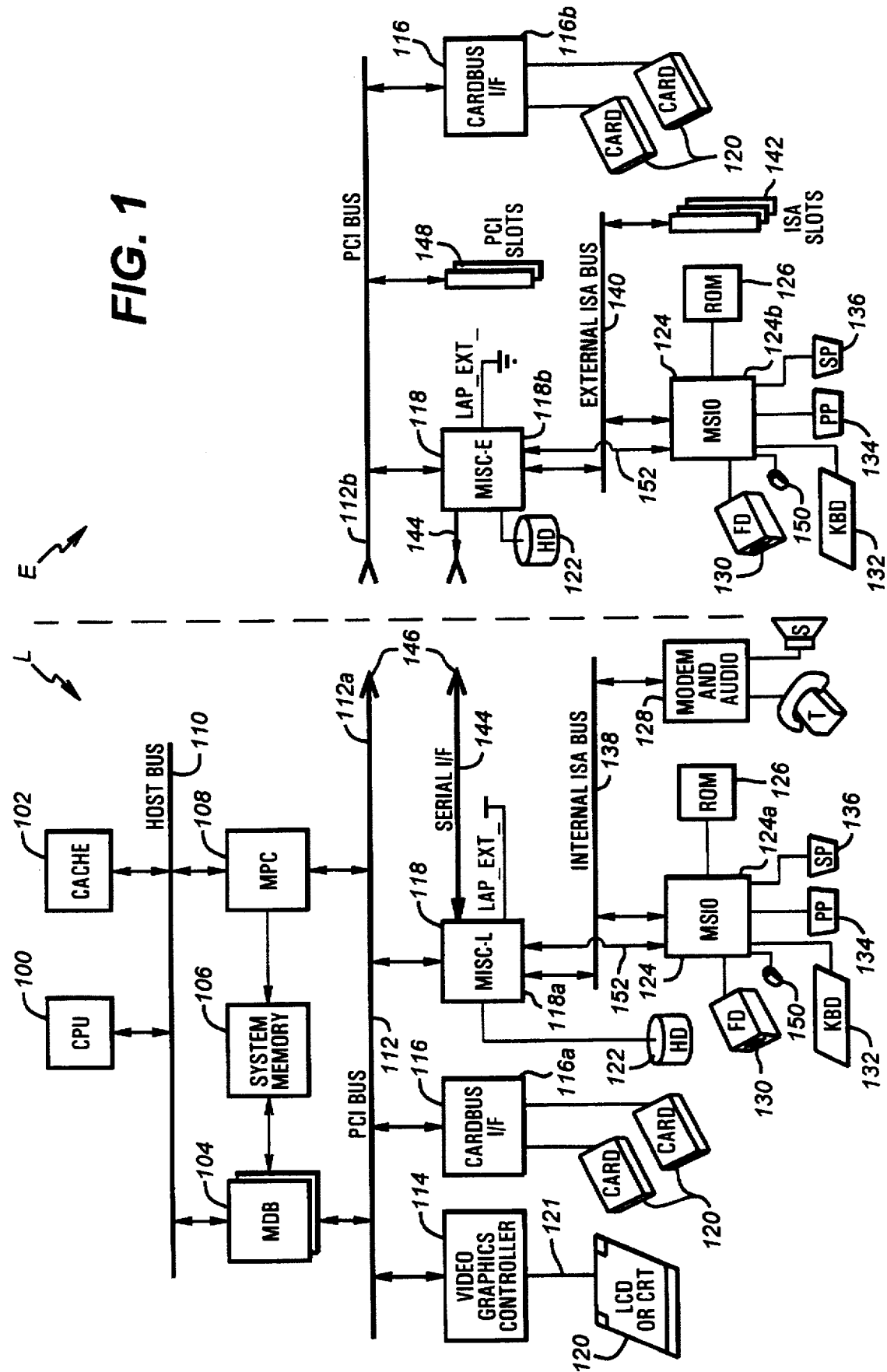
FIG. 1 is a block diagram illustrating a laptop computer system L and corresponding expansion base unit E in which the invention is preferably implemented.

Referring now to FIG. 1, illustrated is a block diagram of a computer system utilizing the present invention. The computer system is shown divided into a laptop portion L (hereinafter laptop computer L) and an expansion base unit portion E (hereinafter expansion base E). The laptop computer L is an operationally autonomous apparatus which is detachable from the expansion base E for remote computing operations. While the laptop computer L is docked into the expansion base E, the laptop computer L operates on AC power, and while the computer L is detached from the expansion base E the laptop computer L operates from battery power. Mechanisms are also provided to operate the laptop computer from AC power while removed from the expansion base E. The expansion base E typically provides expandability for functions not included in the laptop portion L.

A Central Processing Unit (CPU) 100 is provided in the laptop computer L which is a conventional microprocessor, such as an Intel Pentium® and equivalent microprocessors or other varieties of microprocessor. The CPU 100 couples to a host bus 110 for communicating with system logic such as a cache memory 102, a Mobile Peripheral component interconnect bus Cache controller (MPC) 108 and a pair of Mobile Data Buffers (MDB) 104. The cache memory 102 is a conventional cache memory for the CPU 100 and preferably is comprised of high speed synchronous burst static Random Access Memories (RAM). The MPC 108 provides an interface to the cache memory 102 and includes tag RAMs and other logic for creating various cache ways, size, and speed configurations of the cache memory 102.

The MPC 108 and the MDB 104 also couple to a system memory 106 and a Peripheral Component Interconnect (PCI) bus 112. The reader is assumed to be familiar with the PCI bus or the PCI specification incorporated by reference in the background of this specification. The MPC 108 provides address and control to system memory 106, which is comprised of up to 256 MByte of conventional dynamic random access memories (DRAMs). The MDB 104 provides a 64-bit data path between the host bus 110 and the system memory 106 and provides a 32-bit data path to the PCI bus 112. The MPC 108 and MDB 104 are proprietary devices having three major functional interfaces: a processor/cache interface, a system memory interface, and a PCI bus interface. The MDB 104 is responsible for buffering data between the three interfaces while the MPC 108 is responsible for handling addressing, command and control. Each of these interfaces operates independently from the other and includes queues for read and write posting between any two of the three interfaces. The processor/cache interface allows the CPU 100 to pipeline cycles into read cycles and allows snoop accesses to the tag RAM to occur while the pipeline cycles are executing. The memory interface controls the system memory 106 and generates control signals to the MDB 104. The interface also allows read ahead operations for those PCI masters issuing a read multiple command. The PCI interface allows MPC 108 to act as a PCI master when the CPU 100 is accessing the PCI bus 112, or as a PCI slave when a PCI device accesses system memory 106.

The PCI bus 112 provides a communications conduit between the laptop computer L and the expansion base E. A portion 112a of the PCI bus 112 resides in the laptop computer L and includes a quickswitch 146 for each signal of the PCI bus 112. The quickswitches 146 are low loss series in-line MOSFET devices with the gate connected to a docking detection means for providing hot plug capabilities. When the laptop computer L is docked into the expansion base E, a portion 112b of the PCI bus 112 in the expansion base E is coupled to the portion 112a to provide an extended PCI bus 112.

In the laptop computer L, the PCI bus 112a further couples to a video graphics controller 114, a card bus interface 116 (particularly 116a) and a mobile integrated system controller (MISC) 118 (particularly 116b). In the expansion base E, the PCI bus 112b further couples to a second MISC 118 (particularly 118b), two PCI slots 148, and a second card bus interface 116 (particularly 116b). The video graphics controller 114 further couples to a low power liquid crystal display (LCD) 120 or alternatively a cathode ray tube (CRT) style monitor. The card bus interface 116 is provided for communicating with add-on cards 120 such as networking cards, modem cards, solid state storage cards and rotating storage cards preferably of a personal computer memory card international association (PCMCIA) style. The MISC 118 provides an industry standard architecture (ISA) bus 138 or 140, and an integrated drive electronics (IDE) hard drive interface for communicating with hard drives 122. The MISC 118 is configurable based on an input pin (LAP_EXT_) for use in both the laptop computer L, as MISC-L 118a, and expansion base E, as MISC-E 118b. As shown in FIG. 1, if LAP_EXT_ is pulled high, the MISC 118 is configured as MISC-L 118a, and if LAP_EXT_is pulled low, the MISC 118 is configured as MISC-L 118b. Thus, two MISC devices, 118a and 118b are coupled to the PCI bus 112, with the MISC-L 118a coupled to the PCI bus portion 112a and the MISC-E 118b coupled to PCI bus portion 112b. The MISC-L is further coupled to the internal ISA bus 138 while the MISC-E is coupled to the external ISA bus 140. The reader is assumed to be familiar with the ISA bus.

A "_" or "#" symbol at the end of a signal name indicates that the signal's active state occurs when it is at a low voltage. The absence of the "_" or "#" symbol indicates that the signal is active at a high voltage.

As the general functionality of the MISC-L 118a and the MISC-E 118b are very similar, at this point they are discussed together for simplicity. The MISC 118 bridges the PCI bus 112 to the ISA bus 138/140 and acts as both a master and slave on the PCI bus 112 and a bus controller on the ISA buses 138 and 140. The MISC 118 further includes a PCI bus arbiter, an ISA bus arbiter, 8237 compatible direct memory access (DMA) controllers, an enhanced DMA controller for fast IDE hard drives, 8254 compatible timers, an 8259 compatible interrupt controller, hot docking support logic, system power management logic, and plug and play support (all not shown in FIG. 1). Some components are disabled upon initialization by software to prevent conflicts of duplicate functions. In the MISC 118 there is also a serial interrupt interface 144 for serially passing interrupts from the MISC-E 118b to the MISC-L 118a providing an interrupt architecture for supporting standard ISA interrupts in a PCI based system.

The MISC 118 and the ISA buses 138 and 140 provide support for standard ISA peripherals such as those combined in a mobile super input/output (MSIO) 124 peripheral. The MSIO 124 peripheral is a proprietary chip having a combination of standard ISA peripherals, such as: a 146818 compatible real time clock (RTC), a floppy controller for interfacing to standard floppy drives 130; an 8051 compatible microcontroller for communicating with a standard keyboard 132 and a pointing device 150, for performing scanning and key code conversions on the keyboard 132, and for performing power management functions; a universal asynchronous receiver transmitter (UART) for providing standard serial ports 136; and parallel port logic for a parallel port 134. A read only memory (ROM) 126 couples to the MSIO 124 for providing code to the 8051 microcontroller. Additionally, the ROM 126 provides basic input/output services (BIOS) code to the CPU 100 which is copied from the ROM 126 and shadowed in system memory 106 upon system initialization so that thereafter the 8051 microcontroller may access the ROM 126 without competing for access with the CPU 100. A serial bus 152 is provided for communicating information relating to power management and hot docking.

In the laptop computer L, a modem and audio peripheral 128 is also provided and coupled the ISA bus 138. The modem and audio peripheral 128 includes a standard telephony communications port for coupling to a telephone T, and an interface for coupling to a pair of stereo speakers S. In the expansion base E, three ISA expansion slots 142 are provided for standard ISA cards.

The polarity switching according to the invention is preferably implemented over a cable 121 between a display interface 1120 in the video graphics controller 114 and a display lines interface 1124 in the LCD or CRT 120. By placing the circuitry discussed below (see FIGS. 2–4) on the videographics controller 114 and the LCD or CRT 120, the EMI produced by signals over the cable 121 is reduced. The cable 121 will typically run external to any shielded compartments housing the laptop computer L and the LCD or CRT 120, so EMI reduction over this cable 121 is especially advantageous.

Circuitry for Generating Polarity Switched Data

Figure 2:
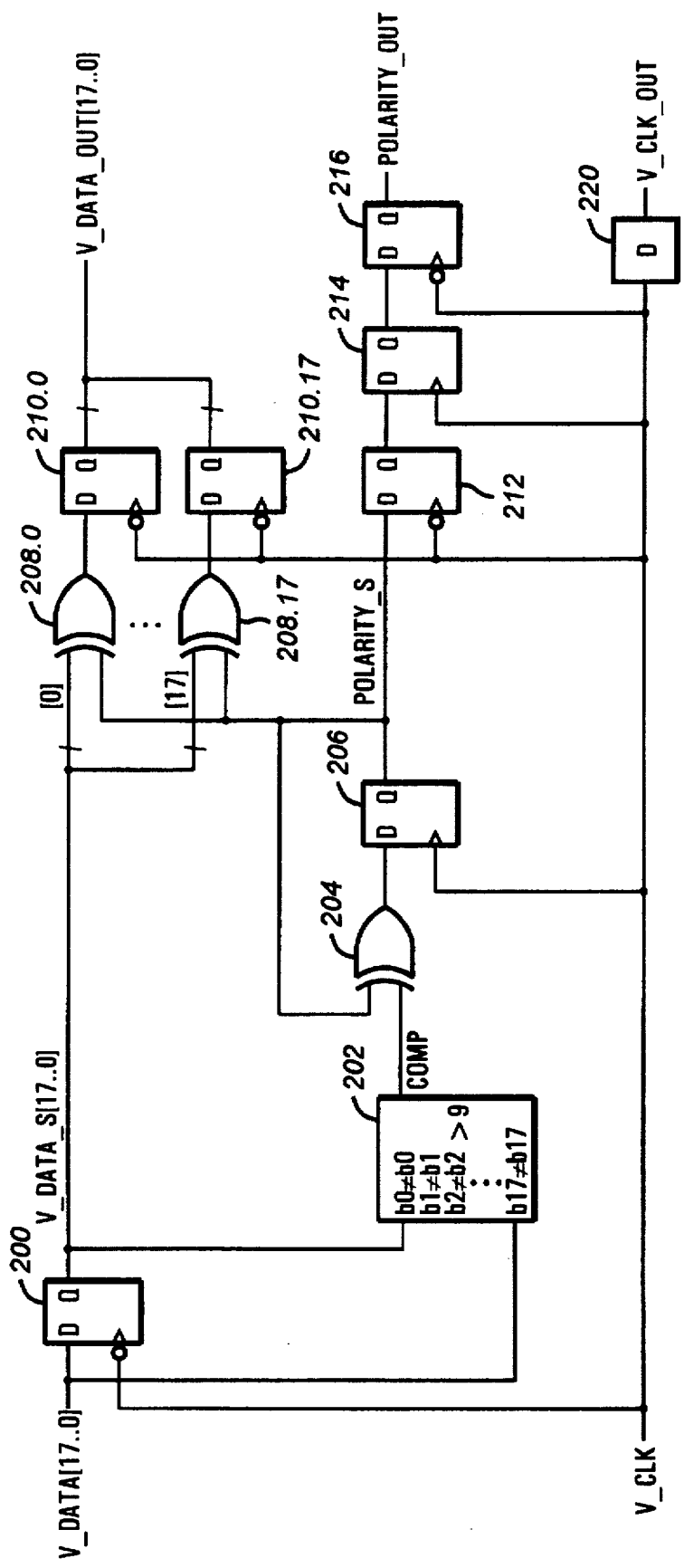
FIG. 2 is a schematic illustration of circuitry that can be used to create the polarity switched data signals for transmission over a data bus according to the invention.
Figure 3:
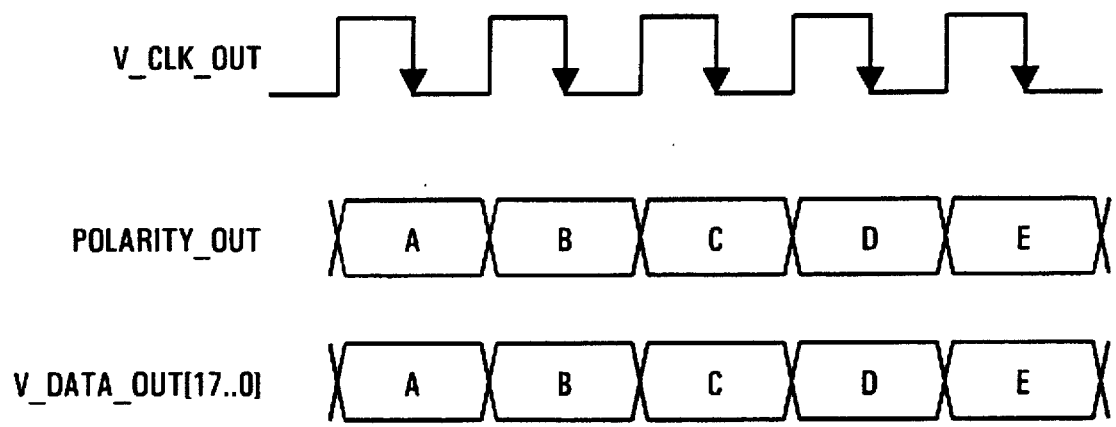
FIG. 3 is a timing diagram indicating the temporal relationship of clock, data, and polarity signals over a bus according to the invention.

Turning to FIG. 2, shown is exemplary circuitry implemented on the video graphics controller 114 for creating the polarity adjusted data for transmission over the cable 121 according to the invention. Standard video data in the form of a set of video data signals V_DATA[17..0] provides video data for transmission over the video cable 121. Similarly, a standard video clock signal V_CLK clocks that data. There are a variety of formats for such data, which are all well-known to the art.

According to the invention, a first video data item to be transmitted is stored for comparison to a second video data item so that the number of bit transitions between those two items can be counted. Therefore, a flip-flop 200 (actually a series of flip-flops) clocks the V_DATA[17..0] signals from its inputs to its outputs, providing synchronized video data outputs V_DATA_S[17..0] on the falling edge of the V_CLK signal. Both the synchronized video data signals V_DATA_S[17..0] and the video data signals V_DATA[17..0] are provided to the inputs of a bit level comparator 202. A comparator 202 output signal COMP is true whenever a bit-by-bit level comparison between the individual V_DATA and V_DATA_S signals indicates that over nine of the 18 bits have changed between the two sets of signals. Nine is chosen as being at least half the number of data lines. The COMP signal is then provided as an input to an XOR gate 204, which also receives as an input a synchronized polarity signal POLARITY_S. The POLARITY_S signal represents the polarity at which the preceding data item provided over the V_DATA signals was output onto the cable 121. In the disclosed embodiment, the POLARITY_S signal being high indicates inverse logic is being used; the POLARITY_S signal being low indicates normal polarity. The POLARITY_S signal is provided by the Q output of a flip-flop 206, which is clocked on the rising edge of the V_CLK signal. The D input of the flip-flop 206 is provided by the output of the XOR gate 204.

Therefore, whenever the COMP signal is true on the rising edge of the V_CLK signal, that will cause the POLARITY_S signal to assume the inverse of its previous state. Conversely, if the COMP signal is false, then the output of the XOR gate 204 will track the POLARITY_S signal, and the POLARITY_S signal will remain unchanged. Because the state of the POLARITY_S signal controls the polarity of the video data on the cable 121, it will be understood that when the COMP signal is true, inverting the POLARITY_S signal, the polarity of the video data on the cable 121 is correspondingly switched.

The POLARITY_S signal is used to generate polarity adjusted video data signals V_DATA_OUT[17..0] through a series of XOR gates 208.0–208.17, two of which are shown. The POLARITY_S signal is provided as an input to the XOR gates 208, which also each receive one of the synchronized video data signals V_DATA_S[17..0]. Therefore, if the POLARITY_S signal is high (inverse polarity) the outputs of the XOR gates 208 are the inverse of V_DATA_S[17..0] signals. If the POLARTY_S signal is low, then the output of the XOR gates 208 simply follow the V_DATA_S[17..0] signals.

The outputs of the XOR gates 208 are then clocked by a corresponding series of flip-flops 210.0–210.17, two of which are shown. These flip-flops 210 are clocked by the falling edge of the V_CLK signal, and together provide as outputs the polarity adjusted video data output signals V_DATA_OUT[17..0].

The POLARITY_S signal itself is clocked through three additional flip-flops 212, 214, and 216 to provide an appropriate delay so that the value of a POLARITY_OUT signal indicates the polarity of the simultaneously output polarity adjusted data signals V_DATA_OUT[17..0]. The V_CLK signal is also provided as a V_CLK_OUT signal with an appropriate delay through a series of flip-flops indicated by a delay block 220. These three sets of output signals are then transmitted over the cable 121.

For a variety of reasons, different clocking patterns may be desired. Further, initial conditions may need to be set. These will be readily understandable and adaptable by one of ordinary skill in the art. But referring to FIG. 3, one will understand that in the disclosed embodiment, the POLARITY_OUT and the V_DATA_OUT signals are provided such that they transition during the rising edge of the V_CLK_OUT signal, and are valid on the falling edge of the V_CLK_OUT signal. For any given data element, such as data element A of FIG. 3, the POLARITY_OUT signal correspondingly indicates the polarity of that data item A as transmitted by the V_DATA_OUT[17..0] signals.

Receiving Circuitry

Figure 4:
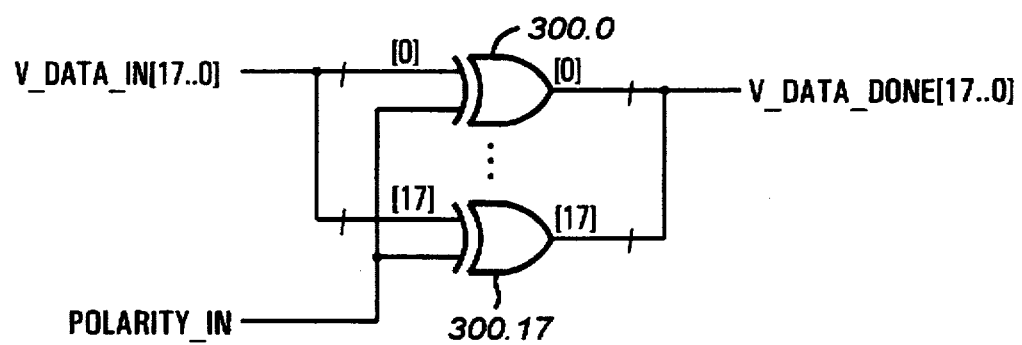
FIG. 4 is a schematic illustration of receiving circuitry for retrieving the original data from the polarity switched data transmitted over a bus according to the invention.

The receiving circuitry in the LCD or CRT 120 at the end of the cable 121 is shown in FIG. 4. This circuitry assumes that the falling edge of the V_CLK_OUT signal clocks the video data into the video display controller within the LCD or CRT 120. Referring to FIG. 4, a POLARITY_signal (corresponding to the POLARITY_OUT signal of FIG. 2) is provided as an input to a series of XOR gates 300.0–300.17, two of which are shown, while the V_DATA_IN[17..0] signals (corresponding to the V_DATA_OUT[17..0] signals of FIG. 2) are provided as the other inputs. If the POLARITY_IN signal is high, this indicates the V_DATA_IN[17..0] signals are being provided at active low logic, while if the POLARITY_IN signal is low, this indicates the V_DATA_IN[17..0] signal are being provided at active high logic. The original data is output by the XOR gates 300 at its correct polarity value as a series of V_DATA_DONE[17..0] signals. The V_DATA_DONE[17..0] signals are thus provided at the same level as the original V_DATA[17..0] signals.

Alternative Circuitry

Alternative circuitry is shown in FIGS. 5–6. As shown in FIG. 5, an Exclusive OR NOR) gate 1300, which performs bitwise operations, and a bitwise adder 1302 are used by the flat panel display interface 1120 to count the number of potential voltage level transitions occurring in data signals NEXTDATA_L[35..0] during successive cycles of the clock signal CLK. The NEXTDATA_L[35..0] signals correspond to the V_DATA_OUT[17..0] signals of FIG. 2, but for a 36 line bus rather than an 18 line bus. The XOR gate 1300 receives data signals NEWDATA[35..0] during successive cycles of the clock signal CLK. The NEWDATA [35..0] signals correspond to the V_DATA[17..0] signals of FIG. 2, but for a 36 line bus rather than an 18 line bus. The XOR gate 1300 receives the data signals NEWDATA[35..0] and display data signals NEXTDATA[35..0] which lead the data signals NEWDATA[35..0] by one cycle of the clock signal CLK. The bit positions of the data signals NEXTDATA[35..0] correspond to the bit positions of the data signals NEXTDATA_L[35..0].

The output of the XOR gate 1300 is connected to the input of the adder 1302 which is clocked on the negative edge of the clock signal CLK. The output of the adder 1302 furnished an indication of the number of transitions that will occur if the graphics information represented by the data signals NEWDATA[35..0] is furnished to the lines 121 in the positive logic format. The output of the adder 1302 is connected to one input of a greater-than circuit 1304 which receives a multi-but signal of ones and zeros indicative of "18" at its other input.

The output of the greater-than circuit 1304 furnished a polarity signal POLARITY' which is asserted, or driven high, if the number of transitions indicated by the adder 1302 is greater than "18," and the polarity signal POLARITY' is deasserted, or negated, otherwise. Thus, the polarity signal POLARITY' is asserted to indicate more than one half of the data signals NEWDATA_L[35..0] will undergo voltage level transitions if the graphics information is transmitted over the lines 121 in the positive logic format. The polarity signal POLARITY' is furnished to the input of a multi-bit D-type flip-flop 1306 furnishes the polarity signal POLARITY.

The data signals NEWDATA[35..0] are furnished to the input of a multi-bit D-type flip-flop 1308 which is clocked on the negative edge of the clock signal CLK. The output of the flip-flop 1308 furnishes data signals NEWDATA_L [35..0] to one input of XOR circuitry 1310. The other input of the XOR circuitry 1310 receives the polarity signal POLARITY', and the output of the XOR circuitry 1310 furnishes the data signals NEXTDATA[35..0]. If the polarity signal POLARITY' is asserted, the XOR circuitry 1310 transforms the graphics information represented by the data signals NEWDATA_L[35..0] into the corresponding negative logic format represented by the data signals NEXTDATA[35..0]. If the polarity signal POLARITY' is deasserted, the graphics information is represented in the positive logic format by the data signals NEXTDATA [35..0].

As shown in FIG. 6, XOR circuitry 1500 of the display lines interface 1124 receives the data signals NEXTDATA_L[35..0] and the polarity signal POLARITY from the flat panel display lines 121. This XOR circuitry 1500 is similar to that illustrated in FIG. 4, except with NEXTDATA_L [35..0] corresponding to V_DATA. In [17..0] and POLARITY corresponding to POLARITY-IN. The XOR circuitry 1500 furnishes data signals DATAOUT[35..0] to a multi-bit D-type flip-flop 1502. If the polarity signal POLARITY is asserted, the graphics information is represented in the negative logic format by the data signals DATAOUT[35..0]. If the polarity signal POLARITY is deasserted, the graphics information is represented in the positive logic format by the data signals DATAOUT[35..0].

The XOR circuitry 1500 preferably includes thirty-six XOR gates, one for each of the data signals NEXTDATA_L[35..0] and DATAOUT[35..0]. Each one of the XOR gates receives one of the data signals NEXTDATA_L[35..0] and furnished the corresponding one of the data signals DATAOUT[35. .0]. The other input of the XOR gates receives the polarity signal POLARITY.

The data signals DATAOUT[35..0] are furnished to the input of the D-type flip-flop 1502 which is clocked on the positive edge of the clock signal CLK. The flip-flop 1502 furnishes data signals DATAOUT_L[35..0] which includes the graphics information for the Pixel A and the Pixel B. The data signals DATAOUT_L[35..18] for the Pixel A includes red data signals RA'[5..0], green data signals GA'[5..0] and blue data signals BA'[5..0]. The bit positions of the data signals DATAOUT_L[35..18] correspond to the bit positions of the data signals NEXTDATA[35..18]. The data signals DATAOUT_L[17..0] for the Pixel B includes red data signals RB'[5..0], green data signals GB'[5..0] and blue data signals BB'[5..0]. The bit positions of the data signals DATAOUT_L[17..0] correspond to the bit positions of the data signals NEXTDATA_L[17. .0].

Figure 7:
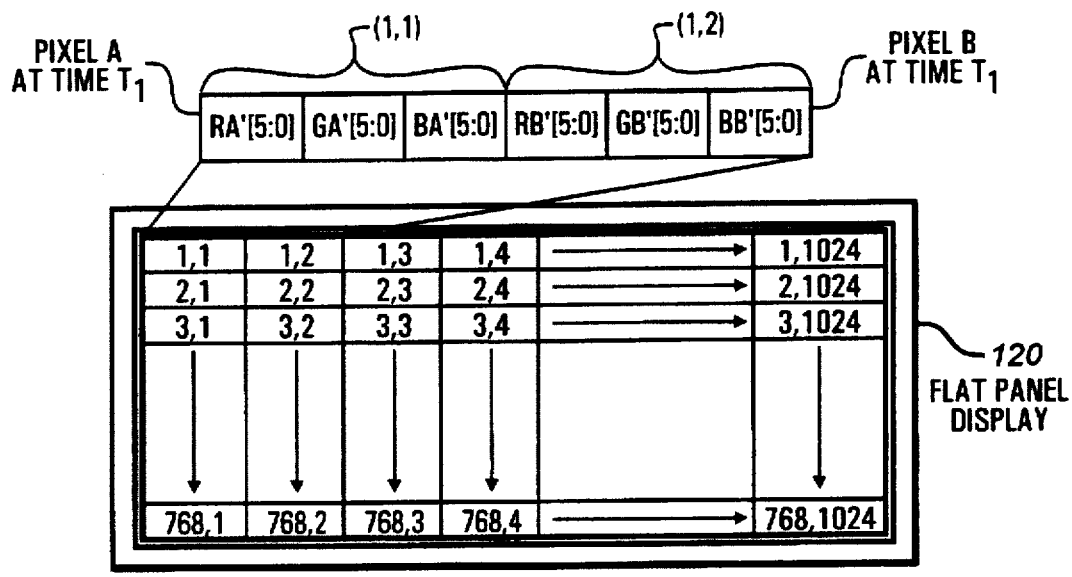
FIG. 7 is a flat panel display that could be used with transmitting and receive circuitry according to the invention.
Figure 8:
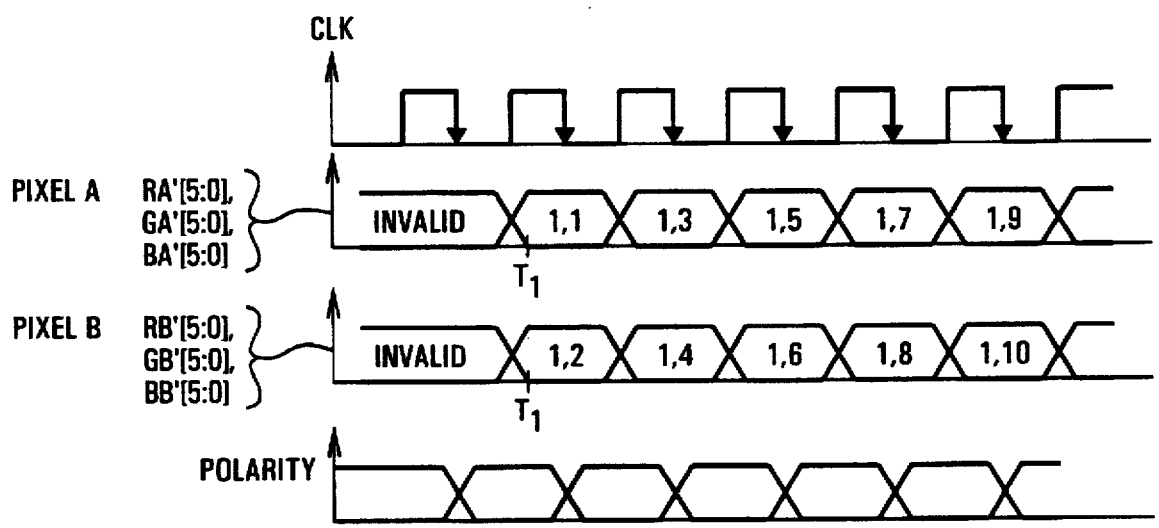
FIG. 8 is a timing diagram illustrating wave forms provided to the flat panel display of FIG. 7.

As shown in FIGS. 7–8, the data signals DATAOUT_L [35..0] representing the graphics information for the Pixel A and the Pixel B are updated on a visual display of the flat panel display 120. Beginning with row one, the flat panel display 120 successively updates each column of a current row of the visual display before updating the next row. As an example, at time $T_1$, Pixel A and Pixel B correspond to coordinates (1,1) and (1,2), respectively.

Other Applications

It will be appreciated that both the circuitry shown in FIGS. 2, 4, 5, and 6 and the application of using a video controller are illustrative only, and the invention has wide application in busing and cabling systems.

For example, a clock is not a requirement, and certain asynchronous data transmission systems that transmit parallel data would benefit from the polarity adjustment according to the invention. Further, a wide variety of circuitry other than the circuitry of FIGS. 2, 4, 5, and 6 can be implemented to accomplish the polarity switching according to the invention. The clocking schemes of 2, 4, 5, and 6 are illustrative only, and a variety of other comparison mechanisms could be used.

For example, the circuitry of FIGS. 2, 4, 5, and 6 could be implemented in an application specific integrated circuit or as discrete components. It could be implemented using multiple inverting and non-inverting output buffers rather than flip-flops and XOR gates, and could use a wide variety of other logic arrangements to switch polarity on subsequent data items in which more than half of the bits change.

Also, the exact temporal correspondence between the data polarity signals and the transmitted data signal is not crucial, and it may actually be advantageous to transmit these signals at different times. For example, it may be desirable to have the polarity signal offset by one-half of a clock cycle from the data signal transmitted over the bus, or even by one or more clock cycles. As long as the temporal correspondence between the particular polarity signal and the data signals is known, this can be accommodated by the receiving circuitry.

Additionally, the circuitry of FIG. 2, for example, could be implemented in software as a preconditioner of data for subsequent transmission over a parallel bus. These techniques can be used on bidirectional buses as well as unidirectional buses, as long as each transmitting and receiving portion is appropriately configured to provide and recognize the switched polarity according to the invention.

On a multiple device bus, some devices could be implemented to use the polarity switching according to the invention while others do not. As an example, the polarity signal over the bus could be pulled down by a resistor, so that a device having no circuitry for providing a switched polarity signal could provide the data at its normal polarity.

Other physical applications include networks, parallel data buses, and even internal data buses, for example, on an IDE cable between an internal disk drive and its controller.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A system for passing data items of m bits over a data bus with reduced electromagnetic interference, the system comprising:
    a data bus with a data polarity line that carries a data polarity signal and with m data lines that carry polarity adjusted data items;
    a data transmission circuit coupled to the data bus and receiving the data items, the data transmission circuit including:
        storage that holds a first data item of the received data items;
        a bit level comparison circuit coupled to the storage and receiving a second data item of the received data items, the bit level comparison circuit providing an indication of whether over m/2 of the bits in the first and second data items are different; and
        a polarity adjusted output circuit receiving the first and second data items, having a polarity output and polarity adjusted data outputs, and responsive to the indication of whether over m/2 of the bits in the first and second data items are different, said polarity adjusted output circuit adapted to provide a first polarity signal on its polarity output and a first polarity adjusted data item on its polarity adjusted data outputs at a first polarity corresponding to the first polarity signal, and to provide a second polarity signal on its polarity output and a second polarity adjusted data item on its polarity adjusted data outputs at a second polarity corresponding to the second polarity signal, wherein the polarity adjusted output circuit provides the second polarity signal to indicate the opposite polarity as the first polarity signal in response to the indication indicating that over m/2 bits are different.

2. The system of claim 1, wherein said data transmission circuit is implemented in a single integrated circuit.

3. The system of claim 1, wherein the data items are video data and the data bus is a video data bus, the system further comprising:
    a video controller coupled to the data transmission circuit, the video controller providing the data items to the data transmission circuit.

4. The system of claim 1 further comprising:
    a decoding receive circuit coupled to the bus and providing decoded received data outputs, the decoding receive circuit providing as the decoded received data the data on the m data lines when a corresponding data polarity signal on the data polarity line is at a first state, and providing as the decoded received data the inverse of the data on the m data lines when the corresponding data polarity signal on the data polarity line is at a second state.

5. The system of claim 4, wherein the data on the m data lines and the corresponding data polarity signal are both present on the data bus at the same time.

6. The system of claim 4, wherein the data bus includes a clock line carrying a clock signal, and wherein the data on the m data lines and the corresponding data polarity signal are offset in time from each other by at least one cycle of the clock signal.

7. The system of claim 4 further comprising:
    a video display coupled to said decoding receive circuit, the video display displaying the decoded received data.

8. A computer system for providing video data with reduced EMI, the system comprising:
    a processor for executing instructions and writing data to be displayed;
    a memory for storing to be displayed;
    a video controller coupled to said memory and said processor, said video controller providing m bit video data items corresponding to the data to be displayed;
    a data bus with a data polarity line that carries a data polarity signal and with m data lines that carry polarity adjusted data items;
    a data transmission circuit coupled to the data bus and receiving the m bit video data items, the data transmission circuit including:
        storage that holds a first video data item of the received video data items;
        a bit level comparison circuit coupled to the storage and receiving a second video data item of the received video data items, the bit level comparison circuit providing an indication of whether over m/2 of the bits in the first and second video data items are different; and
        a polarity adjusted output circuit receiving the first and second video data items, having a polarity output and polarity adjusted data outputs, and responsive to the indication of whether over m/2 of the bits in the first and second video data items are different, said polarity adjusted output circuit adapted to provide a first polarity signal on its polarity output and a first polarity adjusted video data item on its polarity adjusted data outputs at a first polarity corresponding to the first polarity signal, and to provide a second polarity signal on its polarity output and a second polarity adjusted video data item on its polarity adjusted data outputs at a second polarity corresponding to the second polarity signal, wherein the polarity adjusted output circuit provides the second polarity signal to indicate the opposite polarity as the first polarity signal in response to the indication indicating that over m/2 bits are different;
    a decoding receive circuit coupled to the bus and providing decoded received video data outputs, the decoding receive circuit providing as the decoded received video data the data on the m data lines when a corresponding data polarity signal on the data polarity line is at a first state, and providing as the decoded received data the inverse of the data on the m data lines when the corresponding data polarity signal on the data polarity line is at a second state; and a display that receives and displays the decoded received video data.

9. The system of claim 8, wherein said data transmission circuit is implemented in a single integrated circuit.

10. The system of claim 8, wherein the data on the m data lines and the corresponding data polarity signal are both present on the data bus at the same time.

11. The system of claim 8, wherein the data bus includes a clock line carrying a clock signal, and wherein the data on the m data lines and the corresponding data polarity signal are offset in time from each other by at least one cycle of the clock signal.

12. The system of claim 8 further comprising:
a video display coupled to said decoding receive circuit, the video display displaying the decoded received data.

13. A method of reducing EMI over a bus with m data lines and a data polarity line, the method comprising the steps of:
receiving a first data item for transmission over the bus;
transmitting the first data item over the data lines at a first polarity;
transmitting a first polarity signal reflecting the first polarity over the data polarity line;
receiving a second data item for transmission over the bus;
transmitting the second data item over the data lines at a second polarity; and
transmitting a second polarity signal reflecting the second polarity over the data polarity line, wherein the second polarity is the same as the first polarity if no more than m/2 of the bits of the second data item are different from corresponding bits of the first data item, and wherein the second polarity is the opposite of the first polarity if more than m/2 of the bits of the second data item are different from the corresponding bits of the first data item.

14. The method of claim 13, wherein the first data item and the first polarity signal are transmitted simultaneously.

15. A method of displaying video data with reduced EMI in a computer system including a processor; a video controller, an m data line video cable with a data polarity line, and a video display, comprising the steps of,
providing data to be displayed from the processor;
generating first and second video data items in the video controller responsive to the data to be displayed;
transmitting a first polarity signal and a first polarity adjusted video data item corresponding to the fist video data item at a polarity corresponding to the first polarity signal over the data lines and the data polarity line;
determining whether over m/2 input data, bits in the first and second video data items are different;
providing a second polarity signal at the inverse of the first polarity sign if over m/2 input data bits are different;
transmitting the second polarity signal and a second polarity adjusted video data item corresponding to the second video data item at a polarity corresponding to the second polarity signal;

decoding the transmitted first and second polarity adjusted data items; and
displaying the decoded transmitted first and second polarity adjusted data items.

16. A system for transmitting data over an m bit bus with reduced electromagnetic interference, the system comprising:
a source of m bit data items, including a first m bit data item and a second m bit data item;
a transmitter for transmitting data items over the m bit bus; and
means for determining the number of data transitions between said first data item and said second data item, said means for comparing providing the second data item at an inverted polarity to the means for transmitting if said second data item has greater than m/2 data transitions from said first data item.

17. The system of claim 16, wherein said means for comparing is an application specific integrated circuit with circuitry for comparing the first data item to the second data item.

18. The system of claim 16, wherein said means for comparing is a microprocessor executed routine that compares the first data to the second data item.

19. The system of claim 16 farther comprising:
a means for providing a polarity indication in conjunction with the data bus.

20. The system of claim 19, wherein said means for providing is a separate signal line containing polarity status.

21. A method for reducing electromagnetic interference in a system with an m bit data bus for each of a plurality of succeeding data items, the method comprising the steps of:
receiving a first data item of m bits;
receiving a second data item of m bits;
comparing the number of bit transitions between said second data item and said first data item;
providing an adjusted second data item at the same polarity as said second data item if less than a predetermined number of bit transitions occur, and providing said second corrected data item at an inverted polarity if a greater than the predetermined number of bit transitions occurred;
transmitting said second corrected data item over the bus;
repeating the preceding steps using said second corrected data item as the first data item, and using a next data item as the second data item.

22. A method for reducing electromagnetic interference on a data bus with mbits, comprising the steps of:
receiving a first data item of m bits;
receiving a second data item of m bits;
transmitting said first data item over the bus;
if no more than one-half of the m bits of the second data item are different from corresponding ones of the m bits of the first data item, forming a second item that is equal to the second data item and else forming the second item as corresponding to the second data item but with no more than one-half of the m bits of the second item changing from corresponding ones of the m bits of the first data item; and
transmitting a second item over the bus corresponding to said second data item such that no more than one-half of the m bits of said second item change from the m bits of said first data item.

* * * * *

UNITED STATES PATENT AND TRADEMARK OFFICE
CERTIFICATE OF CORRECTION

PATENT NO.   : 5,748,902
DATED        : May 5, 1998
INVENTOR(S)  : Scott W. Dalton, Todd D. Podhaisky It is certified that error appears in the above-identified patent and that said Letters Patent is hereby corrected as shown below:

| | | |
|---|---|---|
| column 10, | Line 8: | replace "fines" with —lines—. |
| column 11, | Line 48: | replace "processor;" a video" with — processor, a video— |
| | Line 50: | replace the last "," with —;—. |
| | Line 56: | replace "fist" with —first—. |
| | Line 59: | replace "data, bits" with —data bits—. |
| | Line 62: | replace "sign" with —signal—. |
| column 12, | Line 26: | replace "farther" with —further—. |
| column 12, | Line 49: | replace "mbits" with —m bits—. |

Signed and Sealed this

Twenty-eighth Day of July, 1998

Attest:

BRUCE LEHMAN

*Attesting Officer*            *Commissioner of Patents and Trademarks*